United States Patent
Bae et al.

(10) Patent No.: US 10,570,532 B2
(45) Date of Patent: Feb. 25, 2020

(54) POLYOLEFIN PELLET FOR PREPARING FIBER AND FIBER COMPRISING THE SAME

(71) Applicant: LG CHEM, LTD., Seoul (KR)

(72) Inventors: Jong Yong Bae, Daejeon (KR); Nak-Kyu Song, Daejeon (KR); In Gyu Park, Daejeon (KR); Yi Young Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/509,994

(22) PCT Filed: Dec. 10, 2015

(86) PCT No.: PCT/KR2015/013529
§ 371 (c)(1),
(2) Date: Mar. 9, 2017

(87) PCT Pub. No.: WO2016/093644
PCT Pub. Date: Jun. 16, 2016

(65) Prior Publication Data
US 2017/0298538 A1    Oct. 19, 2017

(30) Foreign Application Priority Data
Dec. 10, 2014 (KR) .................. 10-2014-0177145
Dec. 9, 2015 (KR) .................. 10-2015-0175284

(51) Int. Cl.
| C08F 210/16 | (2006.01) |
| C08F 10/02 | (2006.01) |
| D01F 6/04 | (2006.01) |
| C08F 4/6592 | (2006.01) |
| C08F 4/659 | (2006.01) |
| C08F 110/02 | (2006.01) |

(52) U.S. Cl.
CPC ............ D01F 6/04 (2013.01); C08F 4/65908 (2013.01); C08F 110/02 (2013.01); C08F 4/6592 (2013.01); C08F 4/65916 (2013.01); C08F 4/65925 (2013.01); D10B 2321/021 (2013.01); D10B 2401/06 (2013.01)

(58) Field of Classification Search
CPC .... C08F 100/02; C08F 210/02; C08F 4/6592; C08F 4/65904; D01F 6/04
See application file for complete search history.

(56) References Cited

U.S. PATENT DOCUMENTS

| 5,629,253 A | 5/1997 | Chang |
| 5,874,513 A | 2/1999 | Watanabe et al. |
| 6,054,544 A | 4/2000 | Finlayson et al. |
| 6,162,871 A | 12/2000 | Watanabe et al. |
| 6,423,808 B1 | 7/2002 | Watanabe et al. |
| 6,506,842 B1 | 1/2003 | Heck et al. |
| 8,071,835 B2 | 12/2011 | Wu et al. |
| 8,436,101 B2 | 5/2013 | Nozue et al. |
| 2006/0235171 A1 | 10/2006 | Lee et al. |
| 2009/0234083 A1 | 9/2009 | Bigiavi et al. |
| 2010/0197837 A1 | 8/2010 | Zahalka et al. |

FOREIGN PATENT DOCUMENTS

| EP | 2428525 A2 | 3/2012 |
| JP | H08199423 A | 8/1996 |
| JP | 10-130432 A | 5/1998 |
| JP | 2001-329007 A | 11/2001 |
| JP | 2004-323983 A | 11/2004 |
| JP | 2005-060896 A | 3/2005 |
| JP | 2006-083371 A | 3/2006 |
| JP | 2006-509904 A | 3/2006 |
| JP | 2007-197724 A | 8/2007 |
| JP | 2008-095112 A | 4/2008 |
| JP | 2009-543927 A | 12/2009 |
| JP | 2010-138385 A | 6/2010 |
| JP | 2012-526175 A | 10/2012 |
| JP | 2013-508507 A | 3/2013 |
| KR | 2000-0055105 A | 9/2000 |
| KR | 10-2001-0023366 | 3/2001 |
| KR | 100372475 B1 | 5/2003 |
| KR | 2008-0030629 A | 4/2008 |
| KR | 2010-0124449 A | 11/2010 |
| TW | 201008985 A1 | 3/2010 |
| WO | 97/26287 A1 | 7/1997 |
| WO | 99/10421 A1 | 3/1999 |
| WO | 2005/058979 A1 | 6/2005 |
| WO | 2014/186381 A1 | 11/2014 |

OTHER PUBLICATIONS

China Petrochemical Press, First edition, Sep. 30, 2002, pp. 556, 557.

Primary Examiner — Caixia Lu
(74) Attorney, Agent, or Firm — Dentons US LLP

(57) ABSTRACT

The present invention relates to a polyolefin pellet for preparing a fiber, and a fiber comprising the same. According to the present invention, provided is a polyolefin, which exhibits a high molecular weight range and a narrow molecular weight distribution and in which the formation of a gel deteriorating the quality of a fiber is reduced. Therefore, by using the polyolefin pellet, the present invention exhibits a molecular weight, a density and a narrow molecular weight distribution, which are equivalent to those of conventional polyolefin, but has high tenacity and an excellent drawing characteristic and can be highly oriented because gel formation is reduced, and therefore, the present invention can be applied to various industrial products due to a high draw ratio and crystallinity during a multifilament operation using the same.

11 Claims, No Drawings

POLYOLEFIN PELLET FOR PREPARING FIBER AND FIBER COMPRISING THE SAME

This application is a National Stage Application of International Application No. PCT/KR2015/013529, filed on Dec. 10, 2015, which claims priority to and the benefit of priority of Korean Patent Application Nos. 10-2014-0177145, filed on Dec. 10, 2014, and 10-2015-0175284, filed on Dec. 9, 2015, all of which are hereby incorporated by reference in their entirety for all purposes as if fully set forth herein.

BACKGROUND OF THE INVENTION (a) Field of the Invention

The present invention relates to a polyolefin pellet for preparing a fiber, and a fiber comprising the same. More specifically, the present invention relates to a polyolefin pellet that exhibits a high molecular weight and narrow molecular weight distribution, but has high tenacity and an excellent drawing characteristic and can be highly oriented since gel formation is reduced, and the present invention can be applied to various industrial products due to a high draw ratio and crystallinity during a multifilament operation using the same.

(b) Description of the Related Art

Methods for preparing high tenacity fiber polymer are largely divided into two methods, that is, a method of synthesizing new polymer material having a rigid molecular structure and liquid crystal spinning, and a method of reorganizing the existing widely used polymer material consisting of flexible molecular chains by spreading the polymer chains in a drawn direction as possible such that tenacity can be maximally exerted.

Among them, the latter method is being used for high density polyethylene for preparing high tenacity fiber such as a rope, a fishing net, etc.

For reference, high density polyethylene(HDPE) can be produced at low temperature and pressure unlike the existing low density polyethylene, and refers to polyethylene having a density of 0.94 g/cm$^3$ or more. The molecular weight of the high density polyethylene may be distributed from a few thousands to a few millions. Not only the physical properties of the high density polyethylene such as impact resistance, tear strength, environmental stress crack resistance, elongation, etc., but also the processibility such as melt viscosity vary according to the molecular weight, molecular weight distribution and density, etc. Thus, it is required to appropriately control these properties according to the application and utilization range of the high density polyethylene.

Meanwhile, it is known that the mechanical properties of fiber products are more excellent as the molecular weight distribution of high density polyethylene is narrower. That is, if the molecular weight distribution of high density polyethylene is narrow, it has a high draw ratio property, and may have high tenacity due to high drawing. However, if the molecular weight distribution of high density polyethylene is too narrow, processibility may be deteriorated. For example, although high density polyethylene prepared using a common Ziegler-Natta catalyst, chromium catalyst, etc. has excellent processibility, high orientation and drawing are limited and the tenacity is low, and although high density polyethylene prepared using a common metallocene catalyst can be highly oriented and drawn, has molecular weight distribution of 3 or less, and thus, has excellent tenacity, it has poor processibility.

Accordingly, studies on high tenacity fiber products with a narrow molecular weight and improved processibility are required.

SUMMARY OF THE INVENTION

In order to overcome the problems of the prior art, it is an object of the present invention to provide a polyolefin pellet for preparing fiber that exhibits a high molecular weight and narrow molecular weight distribution, and thus, has an excellent drawing characteristic and can be highly oriented, and exhibits improved processibility by reducing the formation of gel.

It is another object of the present invention to provide a fiber comprising the polyolefin pellet and multifilament material using the same.

In order to achieve the objects, one aspect of the present invention provides a polyolefin pellet for preparing fiber wherein a density is 0.94 to 0.96 g/cm$^3$;

a molecular weight distribution (PDI) is 2.0 to 3.0;

a melt index (MI: 190° C., 2.16 kg) is 0.1 to 1.5 g/10 min; and when the polyolefin pellet is manufactured into a casting film at 190° C., the number of gels with a particle diameter of 250 μm or more and less than 650 μm is less than 50 per unit area (m$^2$).

Another aspect of the present invention provides a fiber comprising the above explained polyolefin pellet.

Still another aspect of the present invention provides multifilament material comprising the above explained fiber.

According to the present invention, a polyolefin pellet that exhibits a high molecular weight range and narrow molecular weight distribution, in which the formation of gel deteriorating the quality and processibility of a fiber is reduced, can be provided.

Thus, the polyolefin pellet of the present invention exhibits, compared to the conventional polyolefin, equivalent molecular weight and density, and narrower molecular weight distribution, but exhibits remarkably reduced number of gels, and thus, has excellent tenacity, drawing property and processibility, and can be highly oriented, and therefore, can provide extrusion molded articles applicable for various industrial products due to a high draw ratio and crystallinity during the manufacture of a multifilament.

DETAILED DESCRIPTION OF THE EMBODIMENTS

The terms used herein are only to explain specific embodiments, and are not intended to limit the present invention. A singular expression includes a plural expression thereof, unless it is expressly stated or obvious from the context that such is not intended. As used herein, the terms "comprise" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

Hereinafter, the present invention will be explained in detail.

According to one embodiment of the present invention, a polyolefin pellet for preparing fiber wherein a density is 0.94 to 0.96 g/cm$^3$; a molecular weight distribution (PDI) is 2.0 to 3.0; a melt index (MI: 190° C., 2.16 kg) is 0.1 to 1.5 g/10 min; and when the polyolefin pellet is prepared into a casting film at 190° C., the number of gels with a particle diameter of 250 μm or more and less than 650 μm is less than 50 per unit area (m$^2$), is provided.

As used herein, the term "polyolefin pellet" or "polyolefin resin pellet" means one made in the form of granule with a lager particle diameter than polyolefin resin immediately after polymerization, by granulating polyolefin resin in itself in the form of fine particles obtained by polymerization, or granulating it after mixing with other additives.

In the polyolefin resin for replacing high tenacity fiber, a gel, which is formed due to improper dissolving and the resulting agglomeration of a resin pellet in an extrusion process, causes generation of single yarn or fiber cut in the drawing process of the resin pellet, and thus, becomes a significant hindrance to realization of high tenacity of the resin.

Particularly, although, in the case of injection molded products, the number of gel does not have a significant influence, in case extrusion molded products (high tenacity yarn) are produced, high orientation and draw is required so as to realize high tenacity of a fiber, and thus, if a lot of gels exist in the polyolefin resin pellet, single yarns may be generated due to the gel and high quality fiber products cannot be prepared. Thus, even if other properties are excellent, if a lot of gels exist in the polyolefin resin pellet, high quality fiber products cannot be prepared, and thus, it is required to inhibit gel formation for high orientation and draw. There are various causes of gel formation including property imbalance of polyolefin resin, imbalance in the polymerization process, fouling generated during polymerization, fouling due to a catalyst, and so on.

Particularly, a gel may be formed because the conventional resin pellet comprising a high molecular weight area of polyolefin is not properly dissolved in the extrusion process. In order to overcome such a problem of gel formation, the present invention provides a polyolefin pellet that has a density and a melt index equivalent to the conventional pellet, but in which gel formation is remarkably reduced.

The polyolefin resin of the present invention is prepared in the form of a pellet by granulation by extrusion, etc. after polymerization. At this time, if necessary, additives such as an antioxidant, a processing aid, etc. may be mixed to prepare a pellet. And, after preparing the polyolefin resin in the form of a pellet by extrusion, the prepared pellet may be manufactured into a yarn/film and multifilament material by processing such as extrusion, injection, etc.

The measurement of the number of gels in the polyolefin pellet is carried out, more specifically, by manufacturing the polyolefin pellet into a casting film for gel analysis (54 mm*33 m) at 190° C. over 10 minutes using a single screw extruder, and measuring the number of gels generated in the central 1 m$^2$ area (about 30 mm*about 33 m) excluding the edges of the film with a laser analyzer equipped with an extruder. Such a process is repeated 3 times, and the mean value is determined as the number of gels. Here, an area in which a refractive index difference from the remaining parts is generated in the laser analyzer is defined as a gel, and the gels may be measured while being classified into a gel with a particles diameter less than 250 μm, a gel with a particle diameter of 250 μm or more and less than 650 μm, and a gel with a particle diameter of 650 μm or more, according to the particle diameter.

According to one embodiment of the present invention, when measured by the above explained method, the number of gels with a particle diameter of 250 μm or more and less than 650 μm may be less than 50, preferably, 0 to less than 30, more preferably 0 or more and less than 20, still more preferably 0 or more and less than 10.

The weight average molecular weight of the polyolefin of the present invention may be about 100,000 to about 300,000 g/mol, or about 100,000 to about 180,000 g/mol.

The melt flow index (190° C., 2.16 kg load condition) of the polyolefin according to the present invention may be about 0.1 to about 1.5 g/10 minutes, and it is preferably about 0.2 to about 1.0 g/10 minutes, which is an optimum point capable of balancing forming processibility and mechanical properties.

And, the molecular weight distribution (PDI) of the polyolefin of the present invention may be about 2.0 to about 3.0, or about 2.2 to about 2.8.

According to the present invention, since the number of gels is remarkably reduced as explained above, a fiber with excellent quality can be prepared, and a polyolefin pellet having a high molecular weight range and very narrow molecular weight distribution can be provided. As such, the polyolefin pellet of the present invention exhibits a high molecular weight and narrow molecular weight distribution, but exhibits excellent tenacity and can be highly oriented because the number of gels having a particle diameter of 250 μm or more and less than 650 μm, which deteriorate the quality and processibility of fiber products, is reduced, and thus, can be effectively used for the preparation of high tenacity fiber.

In the polyolefin according to the present invention, the density, melt index and molecular weight distribution properties are related to a draw ratio, tenacity and processibility exhibited when preparing high tenacity fiber products using the same.

The draw ratio is more excellent as the molecular weight distribution of polyolefin homopolymer is narrower. And the tenacity is more excellent as the draw ratio is higher, and at the same draw ratio, it is more excellent as a density is higher and a molecular weight is higher.

That is, it can be seen that a molecular weight distribution should be narrow so as to realize a high draw ratio. However, the molecular weight distribution is too narrow, processibility may be deteriorated, and thus, when the molecular weight distribution is about 2.0 to about 3.0 as explained above, a high draw ratio and appropriate processibility can be realized. And, although a tenacity is more excellent as a molecular weight is higher, i.e., a melt index is smaller, if a molecular weight is too high, a processing apparatus may be heavily loaded thus deteriorating extrusion processibility and productivity. Thus, when the melt index is about 0.1 to about 1.5 g/10 min, more preferably about 0.2 to about 1.0 g/10 min, excellent processibility may be exhibited.

The polyolefin according to the present invention may be ethylene homopolymer or copolymer comprising ethylene and alpha olefin comonomers. The alpha olefin comonomers may include 1-butene, 1-pentene, 1-hexene, 4-methyl-1-pentene, 1-octene, 1-decene, 1-dodecene, 1-tetradecene, 1-hexadecene, 1-octadecene, or 1-eicosens, etc., but are not limited thereto. Among them, alpha olefins having 4 to 10 carbon number is preferable, and one kind or many kinds of alpha olefins may be used together as the comonomers. The content of the alpha olefin commoners in the copolymer may be preferably about 0.1 to about 45 wt %, more preferably about 0.1 to about 20 wt %, and most preferably about 0.1 to about 4 wt %.

The polyolefin according to the present invention has excellent processability, exhibits a small number of gels per unit area, and has a high draw ratio and high tenacity, etc., and thus, can be used for the preparation of high tenacity fiber.

Meanwhile, according to one embodiment of the present invention, the polyolefin exhibiting the above explained properties may be obtained by polymerizing olefin monomers in the presence of a metallocene catalyst, a hydrocarbyl aluminum scavenger, and hydrogen gas.

More specifically, polyolefin having a high molecular weight and narrow molecular weight distribution can be polymerized, while efficiently inhibiting gel formation in the economical way by controlling the flushing of a reactor, the ratio of the hydrocarbyl aluminum scavenger and moisture ($H_2O$), the concentration of the hydrocarbyl aluminum scavenger, and the introduction amount of hydrogen gas ($H_2$).

According to one embodiment of the present invention the mole ratio of the hydrocarbyl aluminum scavenger and moisture in the reactor may be about 0.8:1 to about 1.2:1, or about 0.9:1 to about 1.1:1. When the mole ratio of the hydrocarbyl aluminum scavenger and moisture is within the above range, the effect of inhibiting gel number may be obtained.

The introduction amount of hydrogen gas may become an important factor for determining melt flow index (MFI) of a product. According to one embodiment of the present invention, the introduction amount of hydrogen gas may be about 30 to about 90 L/min, or about 45 to about 75 L/min. When the introduction amount of hydrogen gas is within the above range, polyolefin having a high molecular weight and narrow molecular weight distribution can be polymerized.

The hydrocarbyl aluminum scavenger may remove moisture in the reactor and stabilize catalytic active sites, thus improving the uniformity of polymerization. According to one embodiment of the present invention, the concentration of the hydrocarbyl aluminum scavenger may be about 0.1 to about 0.3 mM, and when the concentration of the hydrocarbyl aluminum scavenger is within the above range, polyolefin having a high molecular weight and narrow molecular weight distribution can be polymerized.

The hydrocarbyl aluminum scavenger may comprise a compound represented by the following Chemical Formula 3, but is not limited thereto.

   [Chemical Formula 3]

In the Chemical Formula 3,
three Rs may be the same or different, and each independently, is C1-20 hydrocarbyl.

Examples of the compound represented by the Chemical Formula 3 may include trimethylaluminum, triethyl aluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tollylaluminum, dimethylaluminum mexhoxide, dimethylaluminum ethoxide, etc., and preferably, it may be trimethylaluminum, triethylaluminum, or triisobutylaluminum.

According to one embodiment of the present invention, the metallocene catalyst may be a hybrid supported metallocene catalyst comprising at least two kinds of a first metallocene compound and a second metallocene compound, which are different from each other.

Wherein, the first metallocene compound may be represented by the following Chemical Formula 1, and the second metallocene compound may be represented by the following Chemical Formula 2.

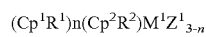   [Chemical Formula 1]

In the Chemical Formula 1,
$M^1$ is Group 4 transition metal;
$Cp^1$ and $Cp^2$ are the same or different, and each independently, one selected form the group consisting of cyclopentadienyl, indenyl, 4,5,6,7-tetrahydro-1-indenyl, and fluorenyl radical, which may be substituted with C1-20 hydrocarbyl;
$R^1$ and $R^2$ are the same or different, and each independently, C1-20 alkyl, C1-10 alkoxy, C2-20 alkoxyalkyl, C6-20 aryl, C6-10 aryloxy, C2-20 alkenyl, C7-40 alkylaryl, C7-40 arylalkyl, C8-40 arylalkenyl, or C2-10 alkynyl;
$Z^1$ is a halogen atom, C1-20 alkyl, C2-10 alkenyl, C7-40 alkylaryl, C7-40 arylalkyl, C6-20 aryl, substituted or unsubstituted C1-20 alkylidene, substituted or unsubstituted amino group, C2-20 alkylalkoxy, or C7-40 arylalkoxy;
n is 1 or 0;

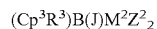   [Chemical Formula 2]

In the Chemical Formula 2,
$M^2$ is Group 4 transition metal;
$Cp^3$ is one selected from the group consisting of cyclopentadienyl, indenyl, 4,5,6,7-tetrahydro-1-indenyl and fluorenyl radical, which may be substituted with C1-20 hydrocarbyl;
$R^3$ is hydrogen, C1-20 alkyl, C1-10 alkoxy, C2-20 alkoxyalkyl, C6-20 aryl, C6-10 aryloxy, C2-20 alkenyl, C7-40 alkylaryl, C7-40 arylalkyl, C8-40 arylalkenyl, or C2-10 alkynyl;
$Z^2$ is a halogen atom, C1-20 alkyl, C2-10 alkenyl, C7-40 alkylaryl, C7-40 arylalkyl, C6-20 aryl, substituted or unsubstituted C1-20 alkylidene, substituted or unsubstituted amino group, C2-20 alkylalkoxy, or C7-40 arylalkoxy;
B is one or more of carbon, germanium, silicon, phosphorus, or nitrogen atom-containing radicals that cross-link the $Cp^3R^3$ ring with J, or a combination thereof;
J is one selected from the group consisting of $NR^4$, O, $PR^4$ and S, and $R^4$ is C1-20 alkyl, aryl, substituted alkyl or substituted aryl.

Among the hybrid supported metallocene catalyst components, the first metallocene compound acts to make mainly low molecular weight polyolefin, and the second metallocene compound acts to make mainly high molecular weight polyolefin, thus enabling preparation of polyolefin having bimodal or multimodal molecular weight distribution.

Characteristic polyolefin obtainable by the first metallocene compound has a low molecular weight of about 1,000 to about 100,000 g/mol, and the polyolefin obtainable by the second metallocene compound has a high molecular weight of about 10,000 to about 1,000,000 g/mol, and it is preferable that the polyolefin obtainable by the second metallocene compound has higher molecular weight than the polyolefin obtainable by the first metallocene compound.

The hybrid supported metallocene catalyst may be prepared by a) contact reacting a supported metallocene catalyst in which at least one metallocene compound is supported with a cocatalyst to prepare an activated supported metallocene catalyst; and b) additionally supporting one or more kinds of metallocene compounds, which are different to the metallocene compound, on the activated supported metallocene catalyst.

For example, a hybrid supported metallocene catalyst of which molecular weight distribution can be easily controlled can be prepared even with a reaction in single reactor, by impregnating one kind of metallocene compound inducing low molecular weight polyolefin and one kind of metallocene compound inducing high molecular weight polyolefin in one carrier together with a cocatalyst.

Representative cocatalysts that can be used for activating the metallocene compound may include alkylaluminum-based compounds such as trimethylaluminum, triethylaluminum, triisobutyl aluminum, trioctyl aluminum, methylaluminoxane, ethyl aluminoxane, isobutylaluminoxane, butylaluminoxane, etc., boron-based neutral or ionic compounds such as tripentafluorophenyl boron, tributylammonium tetrapentafluorophenyl boron, etc., but are not limited thereto.

It is preferable for olefin polymerization that the content of the transition metal of Group 4 of periodic table in the hybrid supported metallocene catalyst finally prepared in the present invention is about 0.1 to about 20 wt %, more preferably about 0.1 to about 10 wt %, most preferably about 1 to about 3 wt %. If the content of the transition metal of Group 4 of periodic table exceeds 20 wt %, the catalyst may leave from the carrier to cause problems such as fouling during polymerization, and the preparation cost may increase, which is not preferable in commercial aspect.

And, the cocatalyst comprises metal of Group 13 of periodic table, and the mole ratio of the Group 13 metal/Group 4 metal of periodic table in the hybrid supported metallocene catalyst is preferably about 1 to about 10,000, more preferably about 1 to about 1,000, and most preferably about 10 to about 100.

And, it is preferable that the second metallocene compound is supported at a mole ratio of about 0.5 to about 2, based on one mole of the first metallocene compound, so as to variously control the molecular weight distribution of the final polyolefin.

It is preferable that the supported amount of the cocatalyst is, based on the metal included in the cocatalyst, about 1 to about 10,000 moles per one mole of the metal included in the first and second metallocene compounds.

The hybrid supported metallocene catalyst may be used for olefin polymerization in itself, and it may be used for prepolymerization by contacting with olefin monomers such as ethylene, propylene, 1-butene, 1-hexene, 1-octene, etc.

The hybrid supported metallocene catalyst of the present invention may be diluted in C5-12 aliphatic hydrocarbon solvents such as isobutene, pentane, hexane, heptanes, nonane, decane and isomers thereof; aromatic hydrocarbon solvents such as toluene and benzene; chlorine-substituted hydrocarbon solvents such as dichlorometane, and chlorobenzene, in the form of slurry, and introduced. It is preferable that the solvent is treated with a small amount of aluminum to remove a small amount of water, air, etc., acting as a catalytic poison, before use. Polyolefin copolymer having a bimodal or multimodal molecular weight distribution curve can be prepared using the hybrid supported metallocene catalyst. When the hybrid supported catalyst is used, copolymerization with alpha olefins is induced by the second metallocene compound that makes particularly a high molecular weight part, thus enabling preparation of high performance polyolefin copolymer in which alpha olefin comonomers are bonded concentratedly to the high molecular weight chains.

The preparation of polyolefin may be carried out according to a standard method while continuously supplying ethylene and alpha olefin having 4 or more carbon number as comonomers, using single continuous slurry polymerization reactor, loop slurry reactor, gas phase reactor, or solution reactor.

The polymerization temperature at which ethylene and alpha olefin having 4 or more carbon number as comonomers are copolymerized using the hybrid supported metallocene catalyst of the present invention, is preferably about 25 to about 500° C., more preferably about 25 to about 200° C., still more preferably about 50 to about 150° C. And, the polymerization pressure is preferably about 1 to about 100 Kgf/cm$^2$, more preferably about 1 to about 50 Kgf/cm$^2$, and most preferably about 5 to about 30 Kgf/cm$^2$.

The polyolefin copolymer according to the present invention is obtained by the copolymerization of olefin monomers and alpha olefin having 4 or more carbon number using the above explained hybrid supported metallocene compound, and has bimodal or multimodal molecular weight distribution.

It is already well known that polyolefin polymerized with a metallocene catalyst has remarkably lower side reactions of catalyst residue than polyolefin polymerized with a Ziegler-Natta catalyst, and thus, is excellent in terms of the properties. However, it commonly has a narrow molecular weight due to the uniform molecular weight, and also has uniform distribution of alpha olefin comonomers, and thus, has poor workability. Particularly, in extrusion blow molding, etc., productivity is remarkably lowered due to the influence of extrusion load, etc., and the product appearance is not good, and thus, field application is difficult. That is, with regard to the application for those which require resin having excellent environmental stress crack resistance (ESCR) and high impact strength, and in which it is essential to increase the molecular weight so as to improve such properties, such as blow molded articles, it has a difficult in terms of processability due to the absolutely insufficient comonomer contents in the high molecular weight region.

Meanwhile, according to still another aspect of the present invention, a fiber comprising the above explained polyolefin pellet is provided.

According to one embodiment of the present invention, the fiber comprising the polyolefin pellet has a tenacity measured by ASTM D 638 of about 9 gf/denier or more, for example, about 9 to about 20 gf/denier, or about 10 to about 18 gf/denier, or about 13 to about 18 gf/denier.

Although the tenacity of previously used commercial fiber was just about 4 to about 6 gf/denier, the fiber according to the present invention exhibits high tenacity as explained above.

And, according to one embodiment of the present invention, the fiber comprising the polyolefin pellet has a draw ratio (RPM2/RPM1) of about 10 to about 24 times, or about 12 to about 24 times, or about 15 to about 22 times, and thus, may have a highly drawn property than the conventional polyolefin fibers.

As the preparation method of the fiber, a common fiber preparation method may be applied, and for example, it may comprise a step of processing by an extruder, using a resin composition comprising the polyolefin.

According to the present invention, multifilament material comprising the fiber is provided.

The multifilament material may be various industrial products requiring tenacity and fiber cut resistance, and specific examples thereof may include geogrid, fiber stone, protective gloves, a marine rope, a fishing net, or industrial fabric, etc.

Hereinafter, preferable examples are presented for better understanding of the present invention, but these examples are presented only for illustration of the present invention, and it is obvious to one of ordinary knowledge in the art that various alterations and modifications can be made within the category and the scope of technical ideas of the present invention, and it is reasonable that such alterations and modifications fall within the claims attached hereto.

EXAMPLE

Preparation of a First Metallocene Catalyst

Synthesis Example 1: Synthesis of [tBu-O—(CH$_2$)$_6$—O$_5$H$_4$]$_2$ZrCl$_2$

A t-Butyl-O—(CH$_2$)$_6$—Cl was prepared using 6-chlorohexanol by the method suggested in the document (Tetrahedron Lett. 2951 (1988)), and was reacted with NaCp to obtain t-Butyl-O—(CH$_2$)$_6$—O$_5$H$_5$ (yield 60%, b.p. 80° C./0.1 mmHg). And, the t-Butyl-O—(CH$_2$)$_6$—O$_5$H$_5$ was dissolved in THF at −78° C., n-BuLi was slowly added thereto, the temperature of the solution was raised to a room temperature, and then, the solution was reacted for 8 hours. The synthesized lithium salt was slowly added to a suspension of ZrCl$_4$(THF)$_2$ (1.70 g, 4.50 mmol)/THF (30 mL) at −78° C. again, and the solution was further reacted at room temperature for 6 hours. All the volatile materials were vacuum dried, and a hexane solvent was added to the obtained oily liquid material to filter. The filtered solution was vacuum dried, and hexane was added to induce precipitation at a low temperature (−20° C.). The obtained precipitate was filtered at a low temperature to obtain a compound [tBu-O—(CH$_2$)$_6$—O$_5$H$_4$]$_2$ZrCl$_2$ in the form of white solid (yield 92%).

1H NMR (300 MHz, CDCl$_3$): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H).

13C NMR (CDCl$_3$): 135.09, 116.66, 112.28, 72.42, 61.52, 30.66, 30.61, 30.14, 29.18, 27.58, 26.00.

Preparation of a Second Metallocene Catalyst

Synthesis Example 2

Synthesis of [methyl(6-t-buthoxyhexyl)silyl(η5-tetramethylCp)(t-Butylamido)]TiCl$_2$ 50 g of Mg(s) was added to a 10 L reactor at room temperature, and then, 300 mL of THF was added thereto. About 0.5 g of I$_2$ was added, and the temperature of the reactor was adjusted to 50° C. After the temperature of the reactor was stabilized, 250 g of 6-t-buthoxyhexyl chloride was added to the reactor at a speed of 5 mL/min using a feeding pump. It was observed that the temperature of the reactor increased by about 4~5° C. as 6-t-buthoxyhexyl chloride was added. While continuously adding 6-t-buthoxyhexyl chloride, the solution was stirred for 12 hours. After the reaction for 12 hours, a black reaction solution could be obtained. 2 mL of the produced black solution was taken, water was added to obtain an organic layer, 6-t-buthoxyhexane could be confirmed through 1H-NMR of the organic layer, and it could be seen from the 6-t-buthoxyhexane that a Grignard reaction progressed well. Thus, 6-t-buthoxyhexyl magnesium chloride was synthesized.

500 g of MeSiCl$_3$ and 1 L of THF were added to a reactor, and then, the reactor was cooled to −20° C. 560 g of the synthesized 6-t-buthoxyhexyl magnesium chloride was added to the reactor at a speed of 5 mL/min using a feeding pump. After the injection of the Grignard reagent was completed, the solution was stirred for 12 hours while slowly raising the temperature of the reactor to a room temperature. After the reaction for 12 hours, it was confirmed that white MgCl$_2$ salts were produced. 4 L of hexane was added, and the salt was removed through a pressurized dehydration and filtration apparatus (labdori, Han Kang Engineering Co., Ltd.) to obtain a filtered solution. The obtained filtered solution was added to a reactor, and then, hexane was removed at 70° C. to obtain a light yellow liquid. It was confirmed through 1H-NMR that the obtained solution is a methyl(6-t-buthoxyhexyl)dichlorosilane compound as desired.

1H-NMR (CDCl$_3$): 3.3 (t, 2H), 1.5 (m, 3H), 1.3 (m, 5H), 1.2 (s, 9H), 1.1 (m, 2H), 0.7 (s, 3H).

1.2 moles (150 g) of tetramethylcyclopentadiene and 2.4 L of THF were added to a reactor, and then, the reactor was cooled to −20° C. 480 mL of n-BuLi was added to the reactor at a speed of 5 mL/min using a feeding pump. After adding n-BuLi, the solution was stirred for 12 hours while slowly raising the temperature of the reactor to room temperature. After the reaction for 12 hours, an equivalent of methyl(6-t-buthoxy hexyl)dichlorosilane (326 g, 350 mL) was rapidly added to the reactor. After the solution was stirred for 12 hours while slowly raising the temperature of the reactor to room temperature, the reactor was cooled again to 0° C., and then, 2 equivalents of t-BuNH$_2$ was added. While slowly raising the temperature of the reactor to a room temperature, the solution was stirred for 12 hours. After the reaction for 12 hours, THF was removed, 4 L of hexane was added, the salts were removed through labdori to obtain a filtered solution. After adding the filtered solution to a reactor again, hexane was removed at 70° C. to obtain a yellow solution. It was confirmed through 1H-NMR that the obtained yellow solution was a methyl(6-t-buthoxyhexyl)(tetramethylCpH) t-butylaminosilane compound.

To the dilithium salt of ligand of synthesized from n-BuLi and ligand dimethyl(tetramethylCpH)t-butylaminosilane in a THF solution at −78° C., TiCl$_3$(THF)$_3$ (10 mmol) was rapidly added. The reaction solution was stirred for 12 hours while slowly raising the temperature from −78° C. to room temperature. After stirring for 12 hours, an equivalent of PbCl$_2$ (10 mmol) was added to the reaction solution at room temperature, and the solution was stirred for 12 hours. After stirring for 12 hours, a bluish black solution was obtained.

THF was removed in the produced reaction solution, and then, hexane was added to filter the product. After removing hexane in the obtained filtered solution, it was confirmed through 1H-NMR that desired methyl(6-t-buthoxyhexyl) silyl(η5-tetramethylCp)(t-butylamido) TiCl$_2$ was obtained.

1H-NMR (CDCl$_3$): 3.3 (s, 4H), 2.2 (s, 6H), 2.1 (s, 6H), 1.8 ~0.8 (m), 1.4 (s, 9H), 1.2 (s, 9H), 0.7 (s, 3H)

<Preparation Example of Hybrid Supported Catalyst>

Preparation Example 1

Silica (manufactured by Grace Davison Company, XPO 2412) was dehydrated while adding vacuum at 800° C. for 15 hours. 1.0 g of silica was put in a glass reactor, 10 mL of hexane was introduced therein, a hexane solution in which 0.1 g of the first metallocene compound obtained in Synthesis Example 1 is dissolved was introduced therein 10 mL each time, and then, the solution was reacted with stirring at 90° C. for 4 hours. After the reaction was completed, the stirring was stopped, and hexane was removed by layer separation, followed by washing with 20 mL of a hexane solution three times, and then, pressure reduction to remove hexane, thus obtaining solid powder. A solution of methyl-aluminoxane (MAO) containing 12 mmol of aluminum in toluene was added thereto, and the solution was slowly reacted with stirring at 40° C. Thereafter, it was washed with a sufficient amount of toluene to remove unreacted aluminum compounds, followed by pressure reduction at 50° C. to remove remaining toluene. And then, in order to prepare a hybrid catalyst, the above obtained supported catalyst and a toluene solution in which 0.1 g of the second metallocene compound prepared in Synthesis Example 2 is dissolved were added to a glass reactor, and the solution was reacted with stirring at 40° C. Thereafter, it was washed with a sufficient amount of toluene, and vacuum dried to obtain solid powder. The prepared final catalyst was directly used for polymerization, or after adding 30 psig of ethylene for 2 minutes, it was used for prepolymerization carried out at room temperature for 1 hour.

Preparation of Polyolefin Pellet

Example 1

The hybrid supported metallocene catalyst obtained in Preparation Example 1 was introduced in a single loop slurry polymerization process to prepare polyolefin.

The flushing of the reactor was carried out until the concentration of foreign substances in hexane became 50 ppm or less, the mole ratio of a hydrocarbyl aluminum scavenger triethylaluminum and moisture in the reactor was adjusted to 1:1, the concentration of the hydrocarbyl aluminum scavenger was maintained within 0.2 to 0.3 mM, and hydrogen gas was introduced at a speed of 60 mL/min. As comonomers, 1-hexene was used.

The PDI (Mw/Mn) of the obtained polyolefin was measured, and summarized in the following Table 1 together.

To the polyolefin (PE), 750 ppm of a primary antioxidant (Irganox 1010, CIBA Company), 1,500 ppm of a secondary antioxidant (Irgafos 168, CIBA Company) and 3,000 ppm of a processing aid (SC110, Ca-St, Doobon Chemical Co. Ltd.) were added, and pellets were prepared by granulation using a twin screw extruder (W& P Twin Screw Extruder, 75pi, L/D=36) at an extrusion temperature of 170 to 220° C.

The extrusion processibility of the resin pellet was tested using a Haake Single Screw Extruder (19pi, L/D=25), under the condition of 240 to 280° C. (Temp. profile (° C.): 240/260/270/280). And, for multifilament forming, it was extrusion molded to a multifilament standard of 500 denier, using a single screw extruder (Korean EM Co., Ltd. Monofilament M/C, 90pi, L/D=30), at an extrusion temperature of 240 to 280° C. (Temp. profile (° C.): 240/260/270/280), under a draw ratio of 22 times.

Example 2

For the polyolefin pellet prepared in Example 1, the same process as Example 1 was repeated except that a multifilament was prepared at a draw ratio of 20 times.

Example 3

For the polyolefin pellet prepared in Example 1, the same process as Example 1 was repeated except that a multifilament was prepared at a draw ratio of 18 times.

Example 4

For the polyolefin pellet prepared in Example 1, the same process as Example 1 was repeated except that a multifilament was prepared at a draw ratio of 16 times.

Comparative Example 1

Polyolefin was prepared by the same method as Example 1, except that the mole ratio of hydrocarbyl aluminium scavenger triethylaluminium and moisture in the reactor was adjusted to 0.5:1, the concentration of the hydrocarbyl aluminium scavenger was maintained at 0.01 mM, and hydrogen gas was introduced at a speed of 20 mL/min in Example 1.

Thereafter, pellets were prepared by the same method as Example 1, and multifilament was prepared at a draw ratio of 16 times.

Comparative Example 2

The same process as Example 1 was carried out, except that polyolefin polymerized using a Ziegler-Natta catalyst (supported in a magnesium carrier and having $TiC_4$ active sites) instead of the metallocene catalyst was acquired to prepare a multifilament composition in Example 1.

Experimental Example

For the resin or fibers of Examples 1 to 4 and Comparative Examples 1 to 2, the properties were evaluated by the following methods and the results are shown in Table 2.

1) Gel counting analysis: The polyolefin pellet was manufactured into a casting film (54 mm*33 m) for gel analysis using a single screw extruder (Dr. Collin Company, Teachline E20T) at 190° C. over 10 minutes, and the number of gels generated in the central 1 $m^2$ area (about 30 mm*about 33 m) excluding the edges of the film was measured by a laser analyzer equipped with an extruder. Such a process was repeated three times, and then, the mean value was determined as the number of gels. Here, an area in which refractive index difference from the remaining parts of the film is generated in the laser analyzer was determined as a gel, and the number of gels having a particle diameter of 250 μm or more and less than 650 μm was counted.

2) density: ASTM D 1505

3) melt index (MI, 2.16 kg/10 min): measurement temperature 190° C., ASTM D 1238

4) molecular weight, molecular weight distribution: A number average molecular weight, a weight average molecular weight and Z average molecular weight were measured using a gel permeation chromatography (GPC) at a measurement temperature 160° C. The molecular weight distribution was indicated as a ratio of the weight average molecular weight and the number average molecular weight.

5) tenacity (unit: g/denier): A tenacity means a strength at a breaking point of a filament, and was measured according to ASTM D 638. Here, the test speed was 200 mm/min, the tenacity was measured 6 times for one specimen and the mean value was taken. For reference, denier is an international unit used to represent the thickness of a filament, and 1 g unit weight for 9,000 m standard length is determined as 1 denier.

6) Draw-ratio: It was measured by the ratio (RPM2/RPM1) of the rotation speed of a pulling roll (RPM2) to the rotation speed of a transferring roll (PRM1).

7) fiber cut: It was measured whether or not fiber cut was generated during forming of the extruded product into a filament.

TABLE 1

| classification | catalyst | MI$_{2.16}$ (unit: g/10 min) | density (unit: g/cm³) | Weight average molecular weight (unit: *10³ g/mol) | PDI (Mw/Mn) | Number of gels having a particle diameter of 250 μM or more and less than 650 μm per unit area |
|---|---|---|---|---|---|---|
| Example 1 | Preparation Example 1 | 0.6 | 0.952 | 130 | 2-3 | <50 |
| Example 2 | Preparation Example 1 | 0.6 | 0.952 | 130 | 2-3 | <50 |
| Example 3 | Preparation Example 1 | 0.6 | 0.952 | 130 | 2-3 | <50 |
| Example 4 | Preparation Example 1 | 0.6 | 0.952 | 130 | 2-3 | <50 |
| Comparative Example 1 | Preparation Example 1 | 0.6 | 0.952 | 130 | 2-3 | <200 |
| Comparative Example 2 | Ziegler-Natta | 0.8 | 0.953 | 120 | 3-4 | <200 |

TABLE 2

| | Draw-ratio | tenacity (g/denier) | classification | Fiber cut |
|---|---|---|---|---|
| Example 1 | 22 times | 18 | multi | No |
| Example 2 | 20 times | 16 | multi | No |
| Example 3 | 18 times | 14 | multi | No |
| Example 4 | 16 times | 12 | multi | No |
| Comparative Example 1 | 16 times | — | multi | Generated |
| Comparative Example 2 | — | — | multi | Generated |

As shown in Table 1, in the polyolefin pellets of Examples 1 to 4 according to the present invention, gels having a particle diameter of 250 μm or more and less than 650 μm were generated less than 50 per unit area (1 m²), and it can be formed into high tenacity, highly drawn multifilament with a draw ratio of 16 to 22 times and tenacity of 12 to 18 g/denier.

To the contrary, in Comparative Examples 1 and 2, gels having a particle diameter of 250 μm or more and less than 650 μm were generated a lot, about 200 per unit area (1 m²), and fiber cut was generated during the forming of filament, and thus, it was impossible to measure a draw ratio and tenacity.

As such, it was confirmed that in the case of Comparative Examples 1 and 2, it is difficult to be highly drawn because of gels (non-molten polymer) during a multifilament processing due to the formation of a lot of gels, and fiber cut is already generated at a critical point before realizing maximum properties.

What is claimed is:

1. A polyolefin pellet for preparing fiber wherein
   a density is 0.94 to 0.96 g/cm³;
   a molecular weight distribution (PDI) is 2.0 to 3.0;
   a melt index (MI: 190° C., 2.16 kg) is 0.1 to 1.5 g/10 min; and
   when the polyolefin pellet is manufactured into a casting film at 190° C., the number of gels with a particle diameter of 250 μm or more and less than 650 μm on a surface of the casting film is less than 50 per unit area (m²),
   wherein a gel is an area of the casting film which has a refractive index difference generated by a laser analyzer compared to remaining areas of the casting film.

2. The polyolefin pellet for preparing fiber according to claim 1, wherein the weight average molecular weight is 100,000 to 300,000 g/mol.

3. The polyolefin pellet for preparing fiber according to claim 1, wherein the polyolefin is obtained by polymerizing olefin monomers in the presence of a metallocene catalyst, a hydrocarbyl aluminum scavenger, and hydrogen gas.

4. The polyolefin pellet for preparing fiber according to claim 3, wherein the mole ratio of the hydrocarbyl aluminum scavenger and moisture ((H$_2$O) in a reactor is 0.8:1 to 1.2:1.

5. The polyolefin pellet for preparing fiber according to claim 3, wherein the introduction amount of the hydrogen gas is 30 to 90 L/min.

6. The polyolefin pellet for preparing fiber according to claim 3, wherein the metallocene catalyst is a hybrid supported metallocene catalyst in which two or more different kinds of metallocene catalyst are supported in a carrier.

7. A fiber comprising the polyolefin according to claim 1.

8. The fiber according to claim 7, wherein tenacity measured according to ASTM D 638 is 9 to 20 gf/denier.

9. The fiber according to claim 7, wherein a draw ratio (RPM2/RPM1) is 10 to 24 times.

10. Multifilament material comprising the fiber of claim 8.

11. The multifilament material according to claim 10, wherein the multifilament material is geogrid, fiber stone, protective gloves, a marine rope, a fishing net, or industrial fabric.

* * * * *

UNITED STATES PATENT AND TRADEMARK OFFICE
CERTIFICATE OF CORRECTION

PATENT NO.           : 10,570,532 B2
APPLICATION NO.      : 15/509994
DATED                : February 25, 2020
INVENTOR(S)          : Jong Young Bae et al.

Page 1 of 1

It is certified that error appears in the above-identified patent and that said Letters Patent is hereby corrected as shown below:

On the Title Page

The inventor data should read as below:
(72) Inventors:  Jong Young Bae, Daejeon (KR)
                Nak-Kyu Song, Daejeon (KR)
                In Gyu Park, Daejeon (KR)
                Yi Young Choi, Daejeon (KR)

Signed and Sealed this
Twenty-third Day of June, 2020

Andrei Iancu
*Director of the United States Patent and Trademark Office*